US006985272B2

(12) United States Patent
Bridgwater et al.

(10) Patent No.: US 6,985,272 B2
(45) Date of Patent: Jan. 10, 2006

(54) DYNAMIC RANGE ENHANCEMENT OF IMAGE DISPLAY APPARATUS

(75) Inventors: Raymond John Bridgwater, Worthing (GB); Anirudh Luthra, Brighton (GB); John Robert Harding, Brighton (GB); Geoffrey Howard Blackham, Hassocks (GB); Ian MacPherson, Steyning (GB)

(73) Assignee: SEOS Limited, West Sussex (GB)

( * ) Notice: Subject to any disclaimer, the term of this patent is extended or adjusted under 35 U.S.C. 154(b) by 8 days.

(21) Appl. No.: 10/723,770

(22) Filed: Nov. 26, 2003

(65) Prior Publication Data

US 2004/0169823 A1 Sep. 2, 2004

(30) Foreign Application Priority Data

Dec. 2, 2002 (GB) ............................................ 0228089

(51) Int. Cl.
*G03B 21/14* (2006.01)
*G02F 1/00* (2006.01)
*G02B 26/00* (2006.01)

(52) U.S. Cl. ........................ 359/237; 359/238; 359/242; 353/20

(58) Field of Classification Search ................. 359/237, 359/238, 242, 247, 250, 259, 245; 353/20, 353/31, 33

See application file for complete search history.

(56) References Cited

U.S. PATENT DOCUMENTS

| 5,575,548 | A | 11/1996 | Lee | 353/31 |
|---|---|---|---|---|
| 6,276,801 | B1 | 8/2001 | Fielding | 353/31 |
| 2003/0214617 | A1 * | 11/2003 | Bierhuizen et al. | 349/113 |
| 2004/0027543 | A1 * | 2/2004 | Ouchi et al. | 353/31 |

FOREIGN PATENT DOCUMENTS

| EP | 0 829 747 A1 | 3/1998 |
|---|---|---|
| EP | 1 081 964 A2 | 7/2001 |
| WO | WO 01/19092 | 3/2001 |
| WO | WO 02/03687 A2 | 10/2002 |

* cited by examiner

*Primary Examiner*—Timothy Thompson
(74) *Attorney, Agent, or Firm*—Iandiorio & Teska

(57) ABSTRACT

Image display apparatus comprising projector means, optical means for splitting incident light, a first modulator for modulating red light, a second modulator for modulating green light, a third modulator for modulating blue light, optical means for recombining the combined modulated red light, green light and blue light, and control means for controlling the operation of the first, second, third and fourth modulators such that the dynamic range of the image display apparatus is enhanced.

10 Claims, 7 Drawing Sheets

DYNAMIC RANGE ENHANCEMENT OF IMAGE DISPLAY APPARATUS

The invention relates to image display apparatus and, more especially, this invention relates to image display apparatus with more than one modulator for modulating the light and control means for controlling the operation of the modulators such that the dynamic range of the image display apparatus is enhanced. The contrast may also be improved.

It is known that by using a first modulator and a second modulator to modulate picture elements of an image in image display apparatus, the contrast range of the projected image can be extended as a result of the finite minimum image brightness above true black being reduced. GB2317290 shows how the contrast of image display apparatus can be improved and describes embodiments showing how the contrast improvements can be achieved. Although this known method can increase the contrast of an image display apparatus, the technology does have some limitations.

If monochromatic modulators are used to modulate the light in image display apparatus, then a first modulator is needed to modulate red light, a second modulator is needed to modulate green light and a third modulator is needed to modulate blue light. If the known method of improving contrast and dynamic range in the image display apparatus is used then each of the red, green and blue modulators would need a second modulator. In this arrangement a total of six modulators would be needed in order to improve contrast. This would be both expensive and difficult to manufacture. Cost would be substantial due to the number of modulators needed and also due to the complex optical components needed firstly to image the first modulator for each of the three colours onto the second modulator for the same colour, and then to combine the modulated light into a single image that can be projected through projection optics to the screen. This would be the case for both reflective and transmissive light modulators.

Alternatively a full colour modulator can be used to modulate light in image display apparatus. Transmissive full colour modulators have an array of red, green and blue pixels. These tend to be large compared to monochrome modulators and when, used in image display apparatus they suffer from inherent and permanent misconvergence. It is therefore very difficult optically to image a single full colour modulator onto a second full colour modulator such that the pixel on pixel alignment is sufficiently accurate to achieve low loss of light and improved contrast.

Single monochrome modulators can also be used with colour sequential illumination in order to produce a full colour image. However this type of colour sequential illumination can produce temporal artefacts which would not be reduced if a second modulator was used.

An aim of the present invention is to obviate and reduce the above mentioned problems and demonstrate significant advantages over the known methods of improving the dynamic range in image display apparatus by reducing leakage through the modulators used to modulate light in the image display apparatus.

Accordingly in one non-limiting embodiment of the present invention there is provided image display apparatus comprising projector means, optical means for splitting incident light, a first modulator for modulating red light a second modulator for modulating green light, a third modulator for modulating blue light, optical means for recombining the modulated red, green and blue light, and a fourth modulator for modulating the combined modulated red light, green light and blue light.

An embodiment of the invention will now be described solely by way of example and with reference to the accompanying drawings in which:

FIG. 1 shows known image display apparatus using a first modulator for modulating red light, a second modulator for modulating green light, a third modulator for modulating blue light, and optical means for splitting and recombining the modulated red, green and blue lights;

FIG. 2 shows an image display apparatus of the present invention with a first red modulator, a second green modulator, a third blue modulator, optical means for splitting and recombining the modulated red, green and blue lights, and a fourth modulator for modulating light; and FIG. 3 shows a schematic representation of one embodiment of the present invention, illustrating the process and control function for controlling the operation of the first red modulator, second green modulator, third blue modulator and fourth modulator.

Referring to the drawings, FIG. 1 shows the optical layout of known image display apparatus 2 using a first modulator 4 to modulate green light a second modulator 6 to modulate red light, and a third modulator 8 to modulate blue light. The incident light which illuminates the modulators passes through optical elements 10, 12, 14 and 16, known as a colour cube, which optical elements split the incident light into red, green and blue and then recombine the modulated red, green and blue light Projection optics 18 then project the image to a screen.

FIG. 2 shows image display apparatus 20 with the light source entering the combination of optical elements known as a colour cube. The light enters a polarising beamsplitting cube 22, green light passes through to polarising beamsplitting cube 24, and red and blue light are reflected to polarising beamsplitting cube 26 where blue light is reflected and red light is transmitted. Green light is modulated by modulator 28, red light is modulated by modulator 30, and blue light is modulated by modulator 32. The modulators in this case are liquid crystal on silicon (LCOS) display panels which have a reflective polarisation based operation. Modulated light from each of the panels is reflected with polarisation in the orthogonal direction. Consequently green light modulated by the green modulator 28 is reflected by polarising beamsplitting cube 24, red light modulated by red modulator 30 is reflected by polarising beamsplitting cube 26, and blue light modulated by blue modulator 32 is now transmitted by polarising beamsplitting cube 26. The modulated red, green and blue lights are recombined by the action of the polarising beamsplitting cube 34. The full colour modulated light is relayed via relay lens 36 to another polarising beamsplitting cube 38. The image formed by the modulators 28, 30 and 32 is imaged onto a fourth modulator 40 via relay optics 36. The modulator 40 is also an LCOS display panel, having a reflective polarisation based operation. Reflected light from this modulator is then reflected by the polarising beamsplitter cube 38 towards the projection optics.

It can be seen that this invention has many benefits over the known methods for improving contrast and enhancing dynamic range in image display apparatus. The total number of modulators used is reduced from the number required if first and second modulators are used for each of the colours red, green and blue. This has a significant cost saving. The optical means for separating and recombining the illumination known as a colour cube, has the effect of maintaining the length of the light path for each of the colours red, green and blue, such that they appear to be in essentially the same position in the optical system. Other optical means are available for separating the illumination into red, green and blue components for modulation by a red modulator, a green modulator and a blue modulator and recombining the modulated light to form a full colour image Other projector architectures both on axis and off axis using either reflective or transmissive panels can be used. The pixels in the red modulator, green modulator and blue modulator are therefore superimposed on one another. This overcomes problems that are caused when using a full colour modulator having red, green and blue pixels arranged in an array. As the red modulator, green modulator and blue modulator appear to be in the same position then the misconvergence is reduced. The optical system that transmits the modulated image from the red, green and blue modulators and their colour cube optical arrangement, comprises simple relay optics 36 and a beamsplitting cube 38. This is a much less complicated system than would be required if first and second modulators were used for each of the three colours red, green and blue. Also colour sequential illumination is not used, thereby avoiding any temporal artefacts that can occur from this type of illumination.

Figure 6:
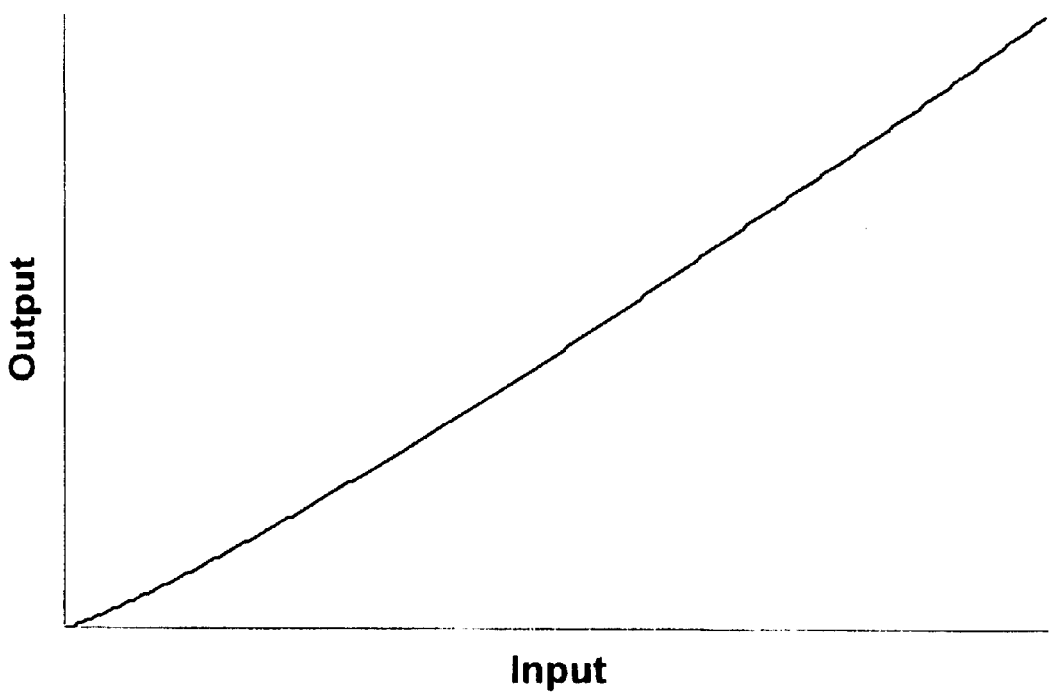

FIG. 6 shows a graph of the output to the fourth modulator. The graph demonstrates the response when de-gamma and the function are applied to the video data input. In this case the function applied is a square root function but other functions can be applied.

Figure 7:
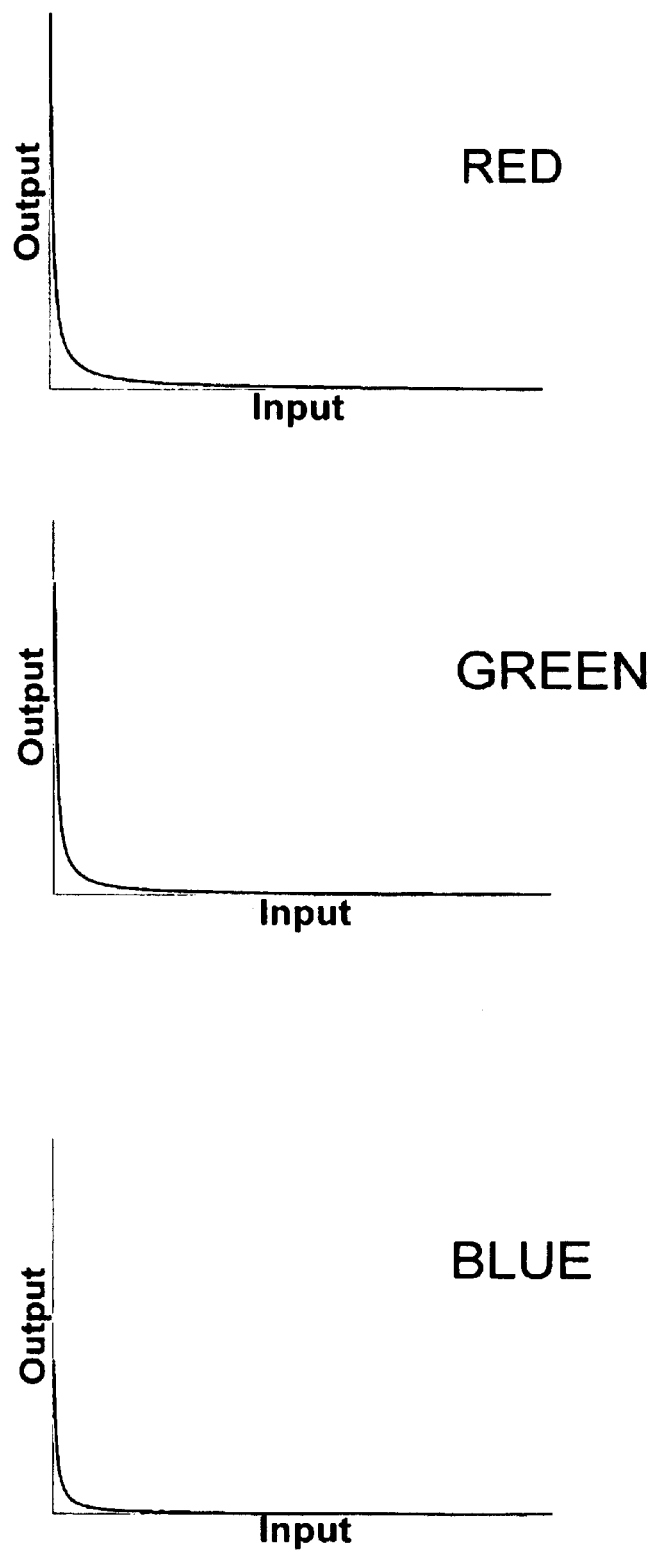

FIG. 7 shows the inverse functions that are applied to the multipliers to the red modulator, green modulator and blue modulator.

Figure 8:
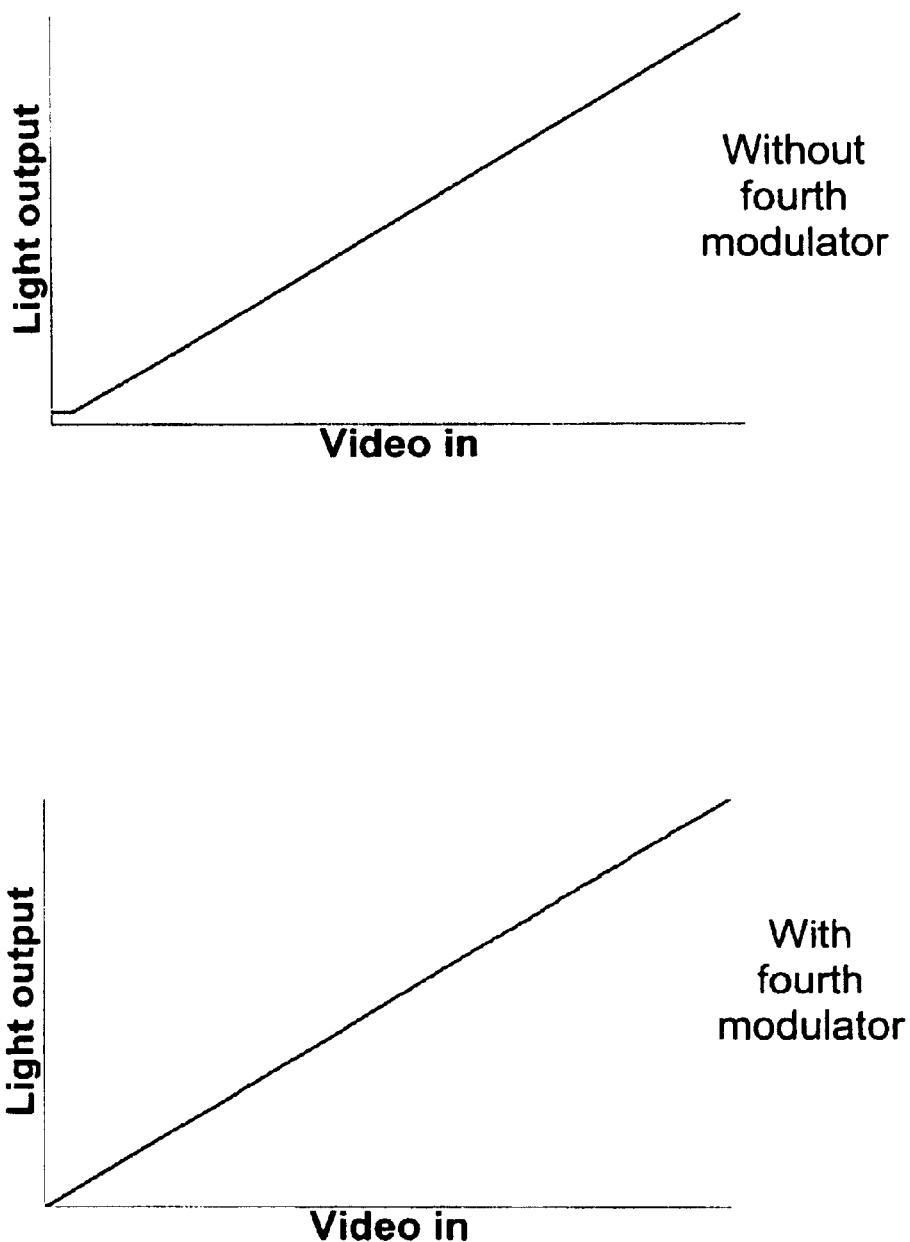

FIG. 8 shows a graph of the light output v. video input for an image generation means with and without the fourth modulator, and demonstrates that the black level is suppressed.

Figure 3:
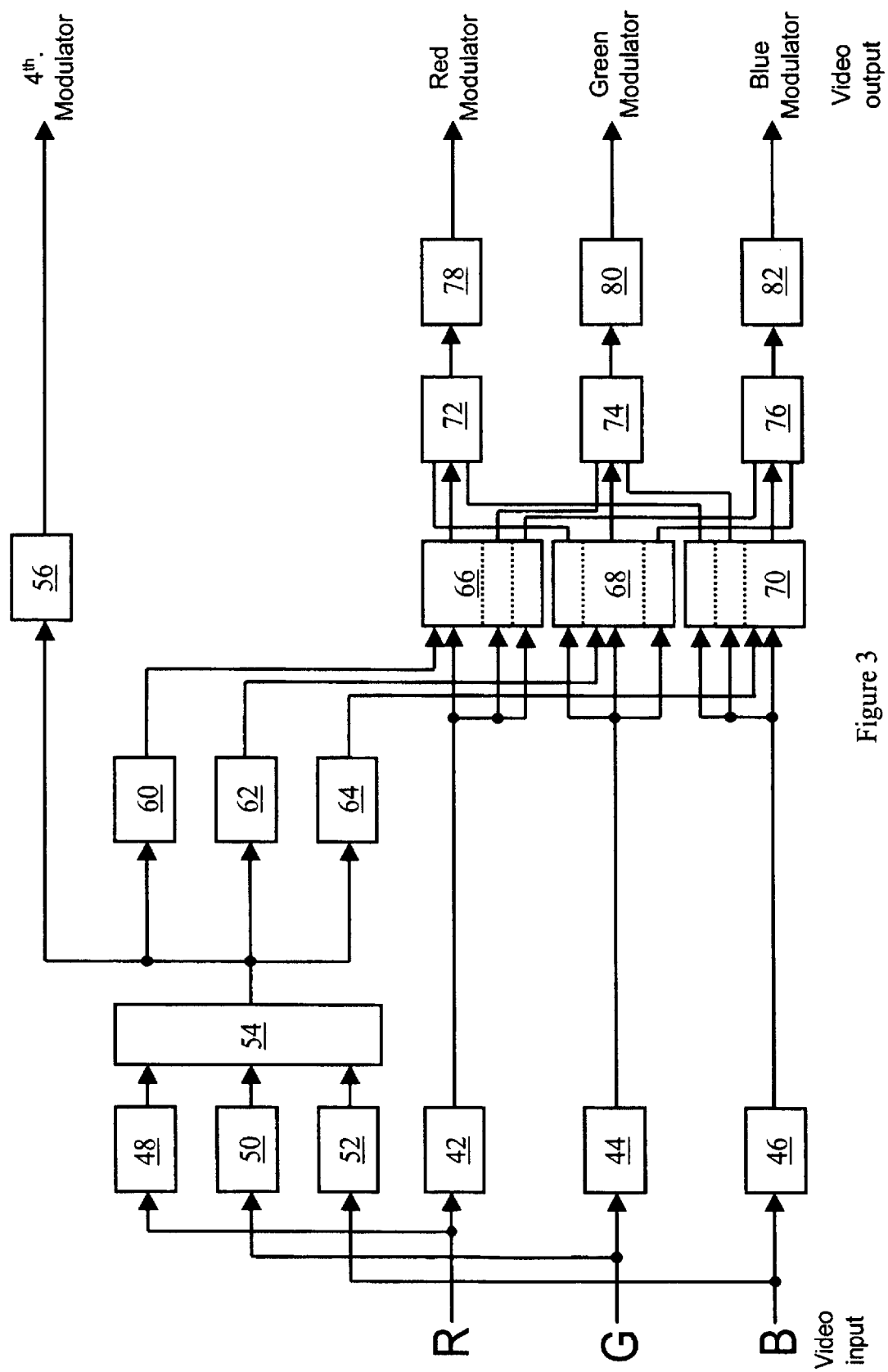
FIG. 3 shows schematically the process for controlling the operation of the first red modulator, the second green modulator, the third blue modulator, and the fourth modulator.
Figure 4:
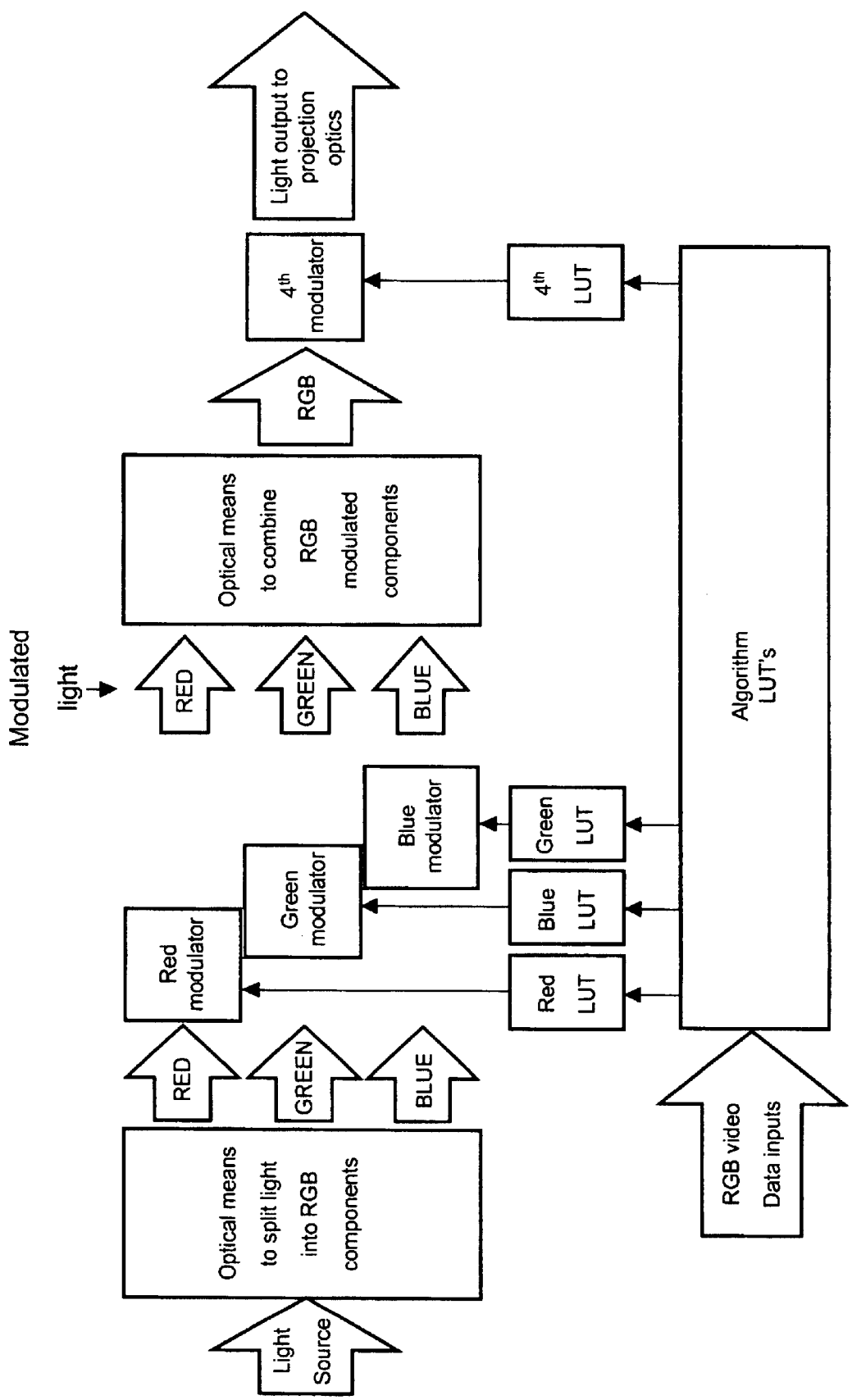
FIG. 4 shows schematically the function of the algorithm and method for controlling the operation of the first red modulator, second green modulator, third blue modulator and the fourth modulator from the video data inputs.
Figure 5:
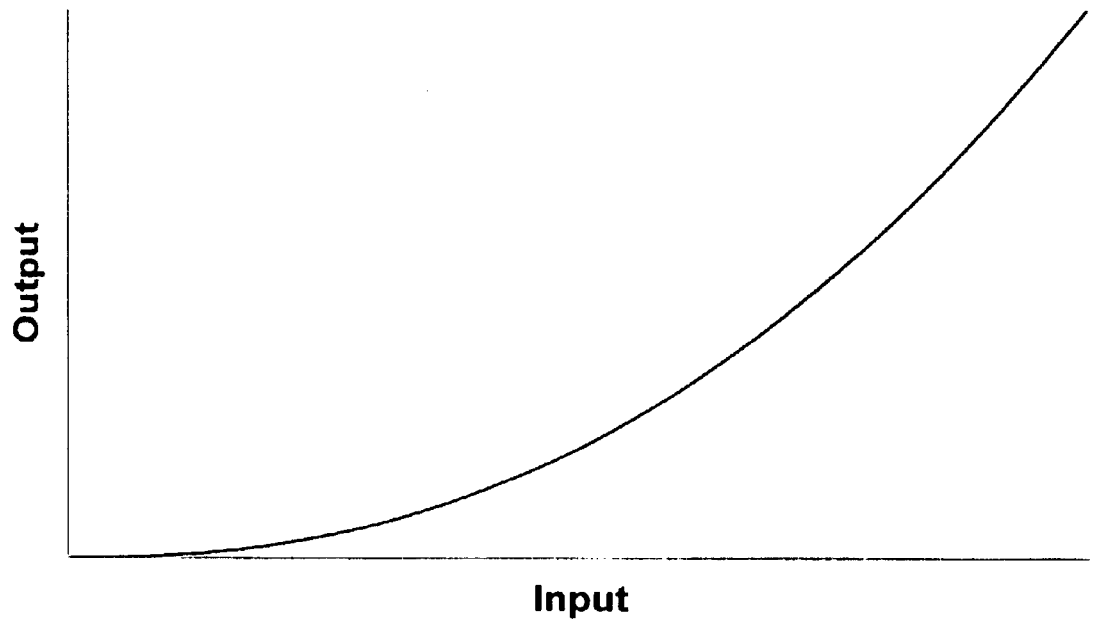
FIG. 5 shows a graph with a de-gamma function that is applied to video data input. Other de-gamma functions can be applied.

Referring now to FIG. 3, look-up tables (LUTs) are used to perform signal manipulation and mathematical functions on the video data inputs. Alternative control means to LUTs could be used, such as functions implemented in digital logic devices, but LUTs are preferred for their flexibility in this embodiment.

The red, green and blue video is initially inputted into two sets of look up tables, LUT 42 adjusts any gamma that is present in the red video input, LUT 44 adjusts any gamma that is present in the green video input, and LUT 46 adjusts any gamma that is present in the blue video input. By adjusting for the input gamma characteristic in this way, the red, green and blue video outputs from the LUTs are essentially linear demand signals for the respective coloured light outputs. Nonlinear demands could instead be generated, if the characteristics of the display panels may be better exploited, but linear demand signals are used in this embodiment for simplicity and predictability of function.

LUT 48 adjusts any gamma that is present in the red video input and also applies a function to the gamma corrected input. LUT 50 adjusts any gamma that is present in the green video input and also applies a function to the gamma corrected input. LUT 52 adjusts any gamma that is present in the blue video input and also applies a function to the gamma corrected input. The outputs from LUTs 48, 50, and 52 are compared by selection means 54 and the dominant signal is selected. This dominant signal drives the fourth modulator via time delay means 56, the time delay being introduced to ensure synchronisation of data to the display panels.

The dominant signal is also outputted to LUTs 60, 62 and 64. LUT 60 determines the output to multiplier means 66 for the red modulator as the inverse of the drive function applied to the fourth panel. LUT 62 determines the output to multiplier means 68 for the green modulator as the inverse of the drive function applied to the fourth panel. LUT 64 determines the output to multiplier means 70 for the blue modulator as the inverse of the drive function applied to the fourth panel.

Multiplier means 66 applies multiplication to the red linear output from LUT 42, multiplier means 68 applies multiplication to the blue linear output from LUT 44 and multiplier means 70 applies multiplication to the green linear output from LUT 46. The red output from multiplication means 66 undergoes colour shift correction in LUT 72 and has any necessary gamma applied in LUT 78 before driving the red modulator. The green output from multiplication means 68 undergoes colour shift correction in LUT 74 and has any necessary gamma applied in LUT 80 before driving the green modulator. The blue output from multiplication means 70 undergoes colour shift correction in LUT 76 and has any necessary gamma applied in LUT 82 before driving the blue modulator. FIG. 3 shows that red multiplier 66 outputs to the green colour shift LUT 74 and blue colour shift LUT 76, green multiplier 68 outputs to red colour shift LUT 72 and blue colour shift LUT 76, and blue multiplier 70 outputs to red colour shift LUT 72 and green colour shift LUT 74. This enables mixing of inputs to allow for the effective colour points shift if desired.

In this preferred embodiment, the modulators exhibit an essentially linear characteristic, whereby the light output is a linear function of the demand input signals. This may be achieved by suitable linearisation in the drive signals to the modulator if necessary. If non-linear characterisitics apply, the signal manipulation may be adapted to correct for this.

An example of the function applied to the inputs in LUTs 48, 50 and 52 is to take the square root of the inputs. Other functions can be applied to the inputs.

Therefore if the red, green and blue gamma corrected inputs are R, G and B respectively and, if the square root function is applied and $\sqrt{R} > \sqrt{G} > \sqrt{B}$, the dominant function selected by selection means 54 will be $\sqrt{R}$. The fourth modulator is therefore driven via time delay means 56 with this input. It can be seen that if LUT 60 applies the inverse function via multiplier means 66 to the red input to the red modulator then the red modulator is driven with a value of $R/\sqrt{R}$ which is also $\sqrt{R}$.

It can then be shown that, as the red panel is driven by a $\sqrt{R}$ function and the fourth panel by a $\sqrt{R}$ function, and the panels themselves exhibit a linear characteristic, the net effect on the optical function is R from the linear red demand signal, thus being the desired function.

The selection and modulation are carried out at individual pixel level. Although the function shown which is applied to the inputs to the LUTs 48, 50 and 52 is a square root function, other functions may also be used, with the inverse of that function applied in LUTs 60, 62 and 64.

The method of controlling the operation of the first, second and third modulators and the fourth modulator forms a key part of the present invention.

Figure 1:
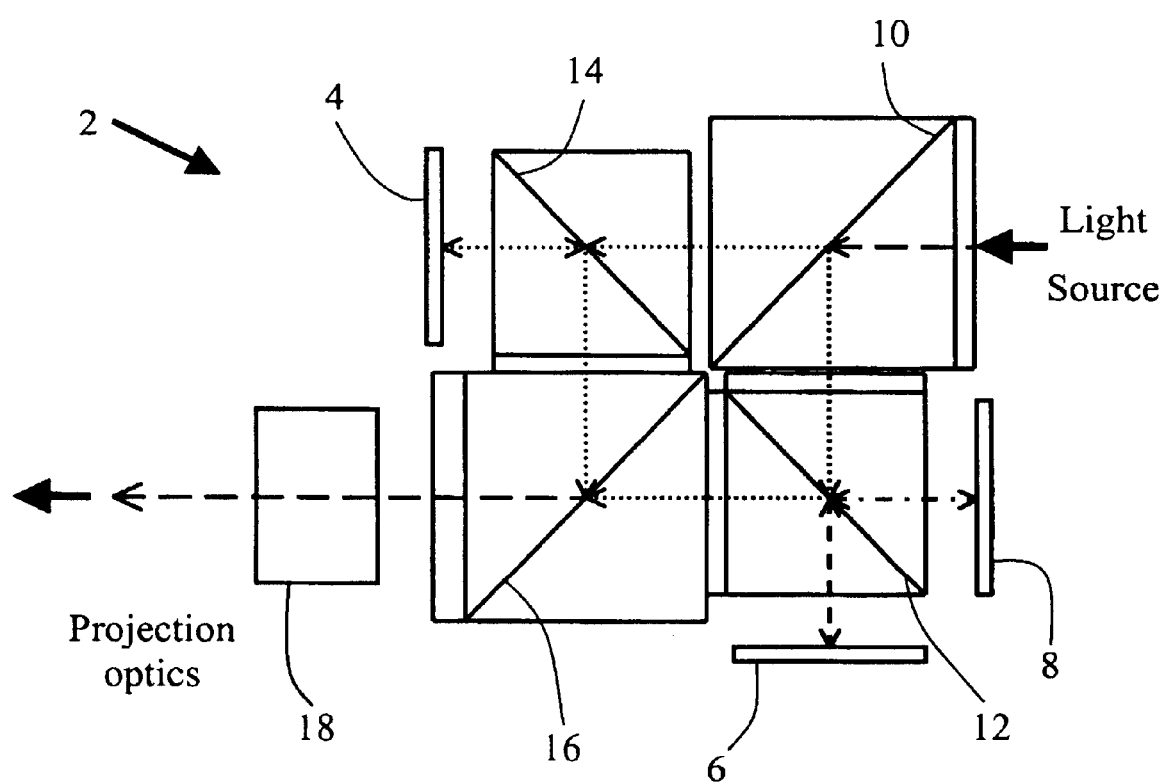
Figure 2:
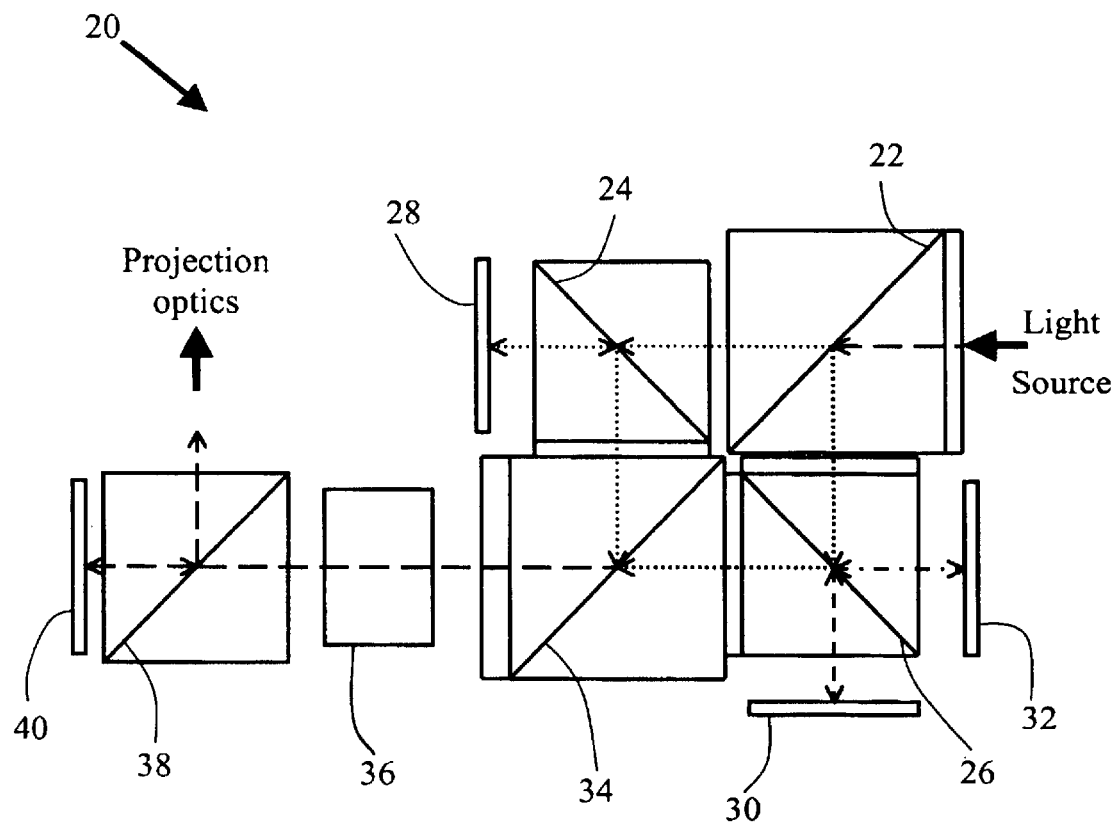

The method described can be used to enhance the dynamic range of image display apparatus whilst avoiding undesirable inter-colour effects It is to be appreciated that the embodiments of the invention described above with reference to FIGS. 2 and 3 have been given by way of example only and that modifications may be effected.

What is claimed is:

1. Image display apparatus comprising projector means, optical means for splitting incident light, a first modulator for modulating red light, a second modulator for modulating green light, a third modulator for modulating blue light, optical means for recombining the modulated red, green and blue light, a fourth modulator for modulating the combined modulated red light, green light and blue light, and control means for controlling the operation of the first, second, third and fourth modulators such that the dynamic range of the image display apparatus is enhanced.

2. Image display apparatus according to claim 1 in which the control means is such that the first modulator, second modulator and third modulator are controlled as a function of red, green and blue video signals, and the fourth modulator is controlled as a function of the red, green and blue video signal to the first, second and third modulators.

3. Image display apparatus according to claim 1 in which the control means is such that the first modulator, second modulator and third modulator are controlled as a function of the highest video signal of the red, green and blue video signals, and the fourth modulator is controlled as a function of the highest video signal of the red, green and blue video inputs to the first red modulator, second green modulator and third blue modulator.

4. Image display apparatus according to claim 1 in which the optical means for splitting and combining the light comprises one or more beamsplitters.

5. Image display apparatus according to claim 1 in which the optical means for splitting the light and the optical means for recombining the light are essentially the same optical means.

6. Image display apparatus according to claim 1 in which the modulators for modulating light are all of the same type.

7. Image display apparatus according to claim 1 in which the modulators are all reflective type modulators for modulating light.

8. Image display apparatus according to claim 1 in which the modulators for modulating light are liquid crystal on silicon modulators for modulating light.

9. Image display apparatus according to claim 1 in which the modulators are all transmissive type modulators for modulating light.

10. Image display apparatus according to claim 1 in which the modulators are one or more different types of modulators for modulating light.

* * * * *